June 16, 1925.
W. L. BESSOLO
TONGS
Filed Feb. 3, 1923
1,542,359
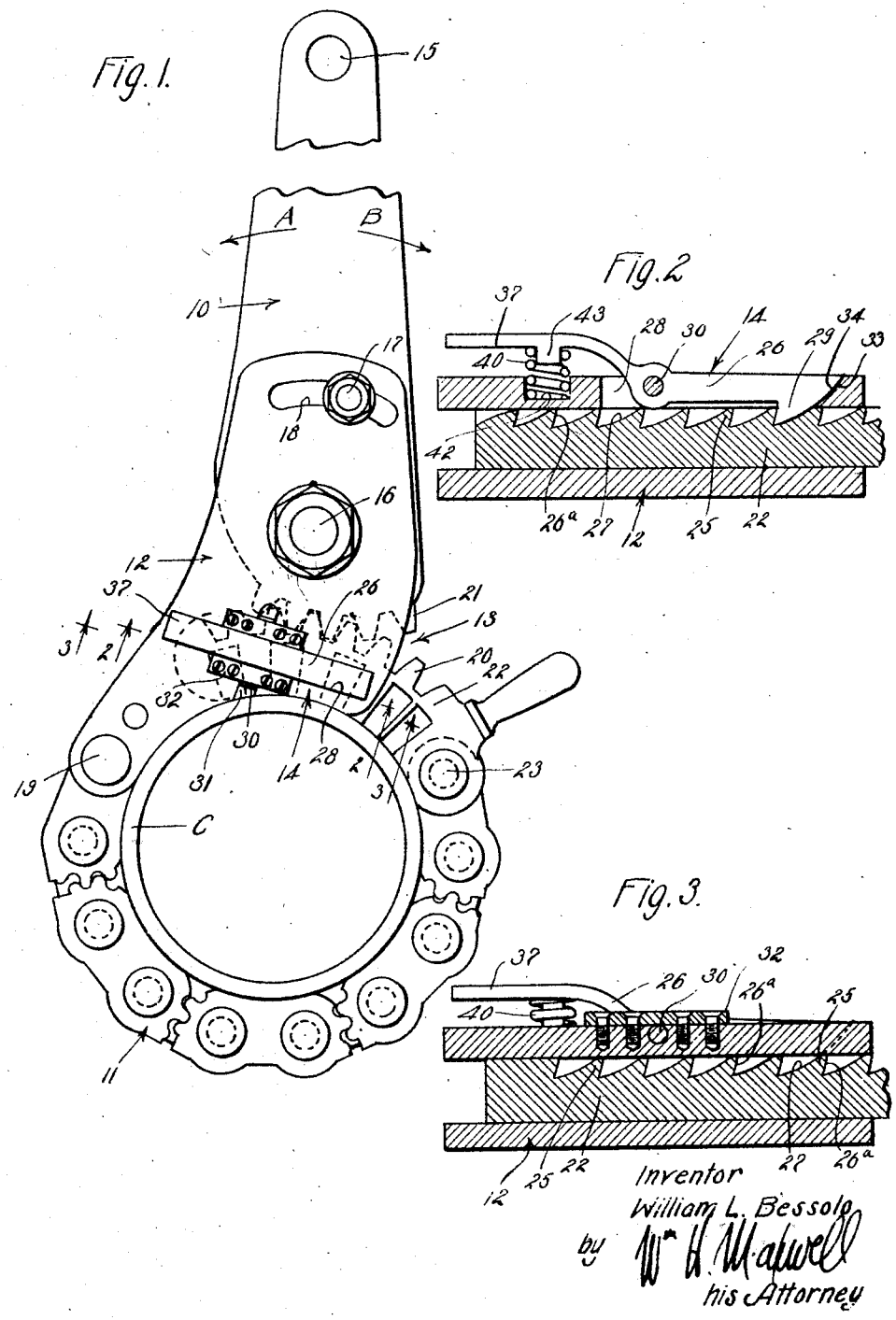
Inventor
William L. Bessolo
by Wm H Malwell
his Attorney Patented June 16, 1925.

1,542,359

UNITED STATES PATENT OFFICE.

WILLIAM L. BESSOLO, OF CLEARWATER, CALIFORNIA.

TONGS.

Application filed February 3, 1923. Serial No. 616,821.

*To all whom it may concern:*

Be it known that I, WILLIAM L. BESSOLO, a citizen of the United States, a resident of Clearwater, county of Los Angeles, and State of California, have invented new and useful Improvements in Tongs, of which the following is a full, clear, and accurate disclosure thereof.

This invention has to do with tongs of the general character used in handling pipes or casings, and is particularly applicable to tongs of the chain type, and it is an object of my invention to provide an improved device of this character which is simple, effective, safe and reliable.

It is an object of this invention to provide, in a tongs of the general character herein described, means for automatically securing the casing engaging mechanism of the tongs in any closed position to which it may be moved.

Another object of my invention is to provide a means, for securing a casing engaging mechanism in operating position, which is effective and reliable and which can be easily and quickly released.

Another object of my invention is to provide means for securing the casing engaging mechanism against being accidentally released, and to arrange and locate said means so that it does not interfere in any way with the operation of the tool, and is in position where it cannot become accidentally actuated to release the casing engaging mechanism.

The objects and features of my invention will be best and more fully understood from the following detailed description of a typical preferred embodiment of my invention, throughout which reference is had to the accompanying drawings, in which—

Fig. 1 is a view of a casing tongs of the chain type embodying the present invention;

Fig. 2 is an enlarged detail sectional view, taken as indicated by line 2—2 on Fig. 1; and Fig. 3 is an enlarged detail sectional view taken as indicated by line 3—3 on Fig. 1.

The tongs which I have illustrated in the drawings includes, generally, a lever or handle part 10; a casing engaging mechanism 11; plates 12, which serve to connect one part of the casing engaging mechanism 11 with the inner end portion of the handle 10; means 13, for detachably connecting another part of the casing engaging mechanism 11 with the inner end portion of the handle 10 so that the casing engaging mechanism is in position to grip a casing and to be actuated by suitable manipulation of the handle 10; and means 14 provided by the present invention to automatically catch and secure the casing engaging mechanism in the position just mentioned.

The handle 10 may be of the usual design and construction, that is, it may be a unitary member convergently tapered from its inner end toward its outer end and may be formed at its outer end with an eye 15 to receive an operating line, or the like. The connecting plates 12 are present in the tongs illustrated in the drawings, to connect one end of the casing engaging mechanism with the inner end of the handle 10. There are two plates 12 arranged at opposite sides of the handle 10. A bolt 16 extends through the plates 12 and the handle 10 to pivotally connect the plates with the handle and a bolt 17 extends through the handle 10 and through arcuate slots 18 in the plates 12 to limit the pivotal movement of the plates relative to the handle.

The particular tongs illustrated in the drawings being of the chain type the casing engaging mechanism 11 includes a chain having one end attached to the handle 10 by means of the connecting plates 12, and its other end adapted to releasably connect with the handle 10. The particular form of chain illustrated in the drawings, is one in which the various parts are interconnected or geared together so that relative movement between adjacent parts at any portion of the chain is communicated throughout the length of the chain. This particular form or construction of chain is more fully described and is claimed in my copending application entitled Pipe tongs, filed December 12, 1921, Serial No. 521,671, allowed July 7, 1922. One end of the chain is permanently connected with the inner end portion of the handle 10 by means of a pivot pin 19. The other end of the chain is free so that the chain can be arranged on and released from a casing, or the like.

The means 13, which I have illustrated in the drawings, for connecting the free end of the casing engaging mechanism with the inner end of the handle when the casing engaging mechanism is in position to embrace a casing, or the like, includes a rack 20 carried by the casing engaging mechanism and a rack 21 carried by the handle 10. The rack 20 is formed on a block 22 connected to the free end of the casing engaging mechanism by a suitable pin 23, and adapted to extend between the connecting plates 12 when the casing engaging mechanism is in the closed position. The block 22 is curved to conform, more or less, to the curvature of the casing to be gripped by the tongs, and the rack 20 formed at the outer edge of the block 22 is likewise curved. The rack 21 is provided at the extreme inner end of the handle 10, and is eccentric to the axis of the bolt 16 so that it can be swung toward and away from the casing "C," by swinging the handle relative to the connecting plates 12, to allow the block 20 to be positioned between the inner end of the handle 10 and the casing "C" and to swing it into meshing engagement with the rack 20. When the handle 10 is swung relative to the connecting plates 12 in the direction indicated by the arrow "A," the rack 21 is moved away from the casing so that the block 20 can be arranged in or removed from between the end of the handle 10 and the casing, while, when the handle 10 is swung relative to the connecting plates 12, in the direction indicated by the arrow "B," the rack 21 is brought into position to cooperatively engage the rack 20 and to move the rack 20 so that it grips the casing "C," and tightens the casing engaging mechanism on the casing "C."

The means 14 provided by the present invention operates to automatically catch the block 20, upon its being arranged in position to be engaged by the rack 21, so that the casing engaging mechanism cannot become accidently released to allow the tongs to release the casing, and is manually operable to release the block so that the casing engaging mechanism can be released from the casing when desired. In the particular embodiment of my invention herein set forth, the means 14 is arranged or incorporated in combination with the block 22 and one of the connecting plates 12, which, of course, is, in effect, a part or continuation of the handle 10. The means 14 is preferably a ratchet means including a series of ratchet teeth 25 and a pawl adapted to cooperate with the ratchet teeth. In the drawings I have shown the ratchet teeth 25 formed in one side, preferably the upper side, of the block 22, and have shown the pawl 26 carried by one of the connecting plates 12 so that it will cooperate with the ratchet teeth 25. The ratchet teeth 25 may be milled or otherwise suitably provided in the block 22, so that each one has a face 26ª faced toward the casing engaging mechanism and an inclined back 27.

The pawl 26 is pivotally connected with the plate 12, and is arranged in a suitable opening 28, provided in the plate 12, so that its hook part 29 projects into the space between the plates 12 to cooperate with the ratchet teeth 25. In the particular form of the invention illustrated in the drawings, trunnions 30 extend from opposite sides of the pawl 26, and are rotatably carried in suitable sockets 31 formed in the outer side of the plate 12 at opposite sides of the opening 28. The trunnions 30 are retained in the sockets 31 by plates 32 attached to the outer side of the plate 12 in the manner clearly illustrated in Figs. 1 and 3 of the drawings. The face of the hook part is carried concentrically with the axis of the trunnions and the faces 26 of the teeth are curved so that they will receive and cooperate with the face of the hook part in the manner clearly illustrated in Fig. 2. The outer end 33 of the hook part 29 is curved to cooperate with the backs 27 of the ratchet teeth to allow the block to be freely moved into position between the plates 12 and is adapted to engage the end 34 of the opening 28 to limit the inward movement of the pawl. The pawl 26 has an extension or handle part 37 which projects above, or beyond, the outer side of the plate 12, and is adapted to be depressed or moved toward the plate 12 to lift the hook part 29 of the pawl out of engagement with the ratchet teeth 25. The handle 37 is preferably designed and proportioned so that it can be conveniently actuated by the operator of the the tongs.

In accordance with my invention I provide resilient means in the ratchet means to resiliently hold the hook part 29 of the pawl in position where it extends inwardly from the plate 12 and cooperates with the ratchet teeth 25 so that the pawl cannot become disengaged from the ratchet teeth accidentally or by jarring of the tool. In the particular form of the invention illustrated in the drawings I arrange a helical spring 40 between the plate 12 and the handle 37 so that it normally holds the handle 37 out, and, therefore, the hook part 29 in. The spring 40 may be maintained in position between the plate 12 and handle 37 by arranging one end of it in a suitable socket 42 provided in the plate 12 and the other end of it over a lug 43 which extends from the handle 37.

From the foregoing description it will be obvious how the tongs hereinabove described may be operated, in substantially the same manner as any other tongs of this general character, and it will be obvious how the means 14 operates to automatically catch and secure the casing engaging mechanism 11 in the closed position upon its being arranged in a closed position. Upon arranging the casing engaging mechanism on a casing "C," by closing the chain around the casing, and arranging the block 20 between the handle 10 and casing "C" and between the plates 12, the series of ratchet teeth on the block are brought into cooperating engagement with the pawl 26 so that the block is secured in the in position and, therefore, holds the chain in the closed position, as the block 22 is moved into the in position the end 33 of the hook part 29 engages the inclined backs 27 of the ratchet teeth to lift the pawl and allow it to drop back of the ratchet teeth. When the hook part 29 of the pawl 26 is dropped back of the first ratchet tooth 25 the block 22 is caught so that it cannot thereafter be moved out from between the plates 12 but can be freely moved further in between the plates 12 to the desired position and is free to move further in between the plates 12 upon the tongs being actuated by movement of the handle 10 in the direction indicated by the arrow "B" in Fig. 1. The ratchet means obviously secures the block 22 in the in position so that it cannot become displaced or released by any normal operation or manipulation of the tool. However, when it is desired to release the block it is merely necessary for the operator to depress the handle 37 to lift the hook part 29 out of cooperative engagement with the ratchet teeth whereupon the block can be freely removed from between the plates 12. It is to be particularly noted that the ratchet means, and, particularly, the operating handle 37 of the ratchet means, is so located with regard to the other parts of the tool that it is not in the way and is not at all likely to become accidentally actuated to release the block 22.

Having described only a typical preferred form of my invention I do not wish to limit myself to the specific details hereinabove set forth but wish to reserve to myself any changes or variations that may appear to those skilled in the art or fall within the scope of the following claims:

Having described a preferred form of my invention, I claim:

1. A tool of the character described including, a handle, a casing engaging mechanism, means connecting one end of the casing engaging mechanism with the handle, the other end of the casing engaging mechanism being adapted to be arranged around a casing and in cooperative relation with a part of the handle, ratchet teeth in connection with said last mentioned end of the casing engaging mechanism, and a pawl carried by said means to cooperate with the ratchet teeth to secure said last mentioned end of the casing engaging mechanism in said position upon its being moved thereto.

2. A tool of the character described including, a handle, a casing engaging mechanism, a pair of plates connecting one end of the mechanism with the handle, the other end of the mechanism being adapted to be arranged around a casing and in cooperative relation with a part of the handle, ratchet teeth in connection with said last mentioned end of the mechanism, a pawl carried by one of the plates, means operating to yieldingly hold the pawl in position to cooperate with the last mentioned end of the mechanism when it is in said position, and a handle in connection with the pawl adapted to be operated to release the pawl from the teeth.

3. A tool of the character described including, a handle, a casing engaging mechanism, a pair of plates connecting one end of the mechanism with the handle, the other end of the mechanism being adapted to be arranged around a casing between the plates and in cooperating relation with the end of the handle, a series of ratchet teeth on said last mentioned end of the mechanism, a pawl carried by one of the plates, means normally tending to move the pawl inward between the plates, means for limiting the inward movement of the pawl, and an operating handle in connection with the pawl.

4. A tool of the character described including, a handle, a rack on the inner end of the handle, a casing engaging mechanism, a plate connecting the inner end of the mechanism with the inner end of the handle, a rack at the outer end of the mechanism adapted to be in cooperative relation with the first mentioned rack when the mechanism is arranged around a casing, ratchet teeth at the outer end of the mechanism, a pawl carried by the plate, means yieldingly holding the pawl in position to cooperate with the teeth to secure the outer end of the mechanism in position where the racks are in cooperate relation upon the outer end of the mechanism being moved thereto, and a handle in connection with the pawl adapted to be operated to release the pawl from the ratchet teeth.

5. A tool of the character described including a handle having a rack on its inner end, a chain having one end connected with the inner end of the handle, a member on the other end of the chain having teeth adapted to cooperate with the rack, ratchet teeth on said member, and a pawl connected with the handle and adapted to cooperate with the ratchet teeth.

In witness that I claim the foregoing I have hereunto subscribed my name this 2nd day of Dec., 1922.

WILLIAM L. BESSOLO.